H. J. S. SAND.
MANUFACTURE AND PRODUCTION OF REFRACTORY VITREOUS SUBSTANCES.
APPLICATION FILED JUNE 6, 1914.

1,169,681.

Patented Jan. 25, 1916.

Draftsman
Walter Abb

Inventor
Henry Julius Salomon Sand
By his Attorneys
Hinson and Hinson

UNITED STATES PATENT OFFICE.

HENRY JULIUS SALOMON SAND, OF NOTTINGHAM, ENGLAND.

MANUFACTURE AND PRODUCTION OF REFRACTORY VITREOUS SUBSTANCES.

1,169,681. Specification of Letters Patent. Patented Jan. 25, 1916.

Application filed June 6, 1914. Serial No. 843,455.

*To all whom it may concern:*

Be it known that I, HENRY JULIUS SALOMON SAND, a subject of the King of Great Britain, residing at the University College, Nottingham, England, have invented new and useful Improvements in the Manufacture and Production of Refractory Vitreous Substances, Such as Quartz Glass and the like, of which the following is a specification.

During the manufacture of vitreous substances (such as quartz-glass, and the like) which cannot in practice be converted into mobile liquids by heat, difficulties arise in attempting to make glass of good quality, even when using pure materials, owing principally to the inclusion of air bubbles, and also owing to furnace gases, dust, and the like.

The object of my invention is to obviate such difficulties and this I effect by inclosing the refractory vitrifiable, or vitreous substance, in a refractory vitreous, envelop, or receptacle, of suitable shape, and preferably of a substance of the same kind as, or practically of the same kind as, that to be manufactured. The said envelop, or receptacle, is evacuated of air, or gases, and it and its contents heated and the said envelop or receptacle collapsed onto the inclosed substance and the whole thus converted into the required product. When the object in view, in the manufacture of the vitreous substance, is the subsequent manufacture of vessels, tubes, or the like, the said envelop, or receptacle, may conveniently be made of annular section.

Should the vitrifiable, or vitreous material become contaminated with traces of dust, or other impurity, previously to, or while, being introduced into the envelop, or receptacle, or during other preliminary operations, such impurities can be removed by heating the said material strongly in air, or oxygen, and in hydrochloric acid gas. Thus, in the case of the manufacture of quartz-glass, from rock-crystal, the crystals may, (after quenching, or breaking up in other suitable manner) be introduced into the envelop, or receptacle, and then be subjected therein to treatment with air, or oxygen, and hydrochloric acid gas at a high temperature (say a temperature of 1000° centigrade, or thereabout,) and, after this, the evacuation be carried out at a similar high temperature, and, later, the heated envelop, or receptacle, be collapsed and the inclosed substance converted to the required product as hereinbefore explained.

Figure 1:
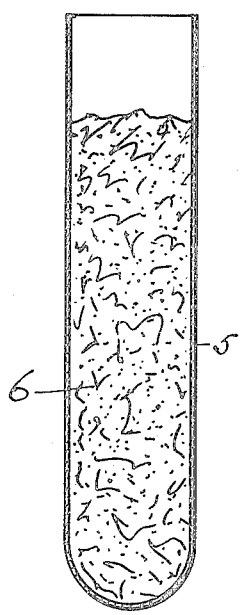
Figure 3:
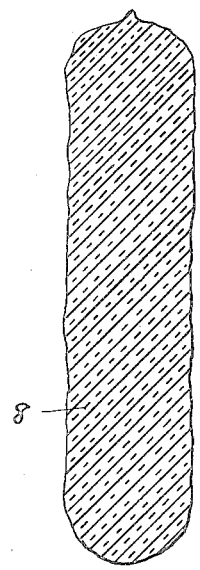
Figure 2:
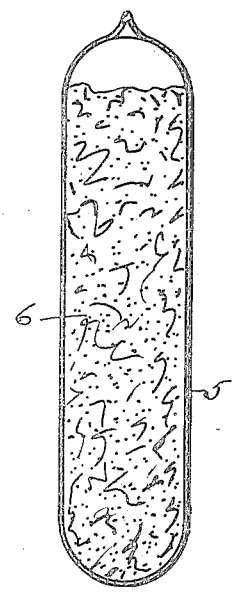
Figure 4:
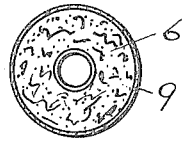
Figure 6:
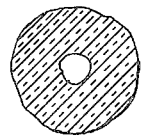
Figure 5:
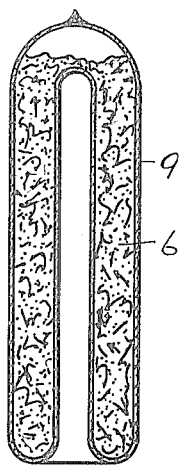
Figure 7:
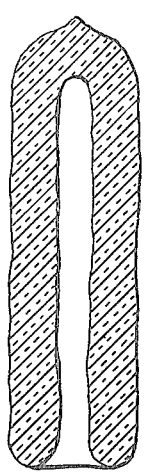

In the accompanying drawing, Figure 1 is a vertical section through an envelop of refractory glass in which a quantity of quartz in divided state has been introduced; Fig. 2 is a similar view of the envelop after it has been exhausted and sealed; Fig. 3 is a similar view of the resulting fused block; Figs. 4 and 5 are respectively plan and side elevation of a tubular envelop; and Figs. 6 and 7 are corresponding sections after the material has been fused therein.

The envelop or container 5 may be of any suitable shape. I have here shown it somewhat in the form of a test tube, through the open end of which a quantity of quartz 6 in divided state is introduced. If this quartz material contains impurities they are now removed by heating the material in the envelop in the presence of air or oxygen and hydrochloric acid gas. After the impurities have been removed the envelop is exhausted and its open end sealed as shown at 7 in Fig. 2. The sealed envelop is then heated to a temperature at which the material therein fuses. At this temperature the envelop itself becomes plastic and collapses upon the inclosed material, forming a protective skin thereon. This skin remains in a pasty or plastic condition during the fusion of the contained material and protects the latter from air, etc.

The value of the process is readily recognized since it permits a relatively large amount of high quality quartz glass to be manufactured by the use of the relatively small quantity comprised in the envelop. Moreover, the latter need not be of high quality. Thus, if a block 8 (Fig. 3) is made for use in lenses for instance, the outer skin (formed by the envelop) on this block, may be removed mechanically if faulty, leaving only the high quality mass formed within the same.

While the envelop is preferably of the same character of material as that contained therein, it is obvious that this need not be so, but any glass may be employed which remains in pasty condition and at the same time impervious to air until the inclosed material has been fused, thus protecting the latter against the inclusion of air bubbles, furnace gases, dust and the like.

In Figs. 4, 5, 6, and 7 I have shown a tubular envelop 9 the walls of which become greatly thickened by the fused material as shown in Figs. 6 and 7.

What I claim is:

1. The method of manufacturing bodies of refractory vitreous material, which consists in incasing such material in an envelop of vitreous material, exhausting the latter and heating the same until the inclosed material is fused, said envelop being rendered plastic and collapsing upon the said material under the influence of said fusing heat.

2. The method of manufacturing bodies of refractory vitreous material which consists in incasing said material in an envelop of substantially like material, exhausting said envelop and heating the latter until the inclosed material is fused, said envelop being rendered plastic and collapsing upon the said material under the influence of said fusing heat.

3. The method of manufacturing bodies of quartz or analogous refractory material, which consists in incasing said material in a protective envelop of substantially like material, exhausting the latter, and heating the same until the inclosed material is fused, said envelop being rendered plastic and collapsing upon the said material under the influence of said fusing heat.

4. The method of manufacturing bodies of quartz or analogous refractory material, which consists in incasing said material in a divided state in a protective envelop of substantially like material, exhausting the latter, and heating the same until the inclosed material is fused, said envelop being rendered plastic and collapsing upon the said material under the influence of said fusing heat.

5. The method of manufacturing bodies of quartz or analogous refractory material, which consists in incasing said material in a protective envelop of substantially like material, removing the impurities from said material within the envelope, exhausting the latter, and heating the same until the inclosed material is fused, said envelop being rendered plastic and collapsing upon the said material under the influence of said fusing heat.

In testimony whereof I have signed my name to this specification in the presence of two subscribing witnesses.

HENRY JULIUS SALOMON SAND.

Witnesses:
ROBERT MARTIN CAVEN,
HERBERT LAMBOURNE.

Copies of this patent may be obtained for five cents each, by addressing the "Commissioner of Patents, Washington, D. C."